July 29, 1952   R. DORAND   2,605,093
DETECTOR APPARATUS FOR DETECTING THE RATE
OF CHANGE OF INCLINATION OF AN OBJECT
Filed April 15, 1949   6 Sheets-Sheet 1
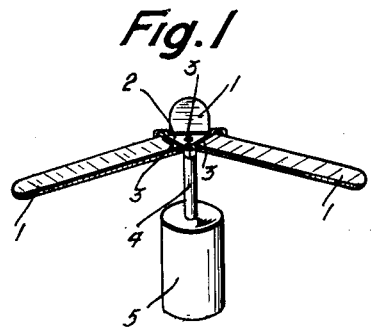
Fig. 1
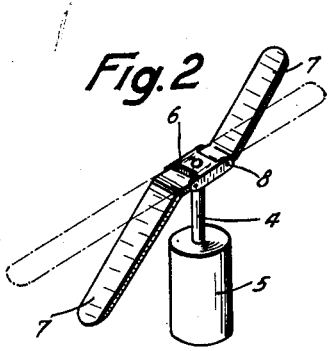
Fig. 2
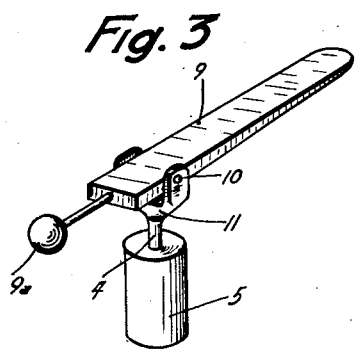
Fig. 3
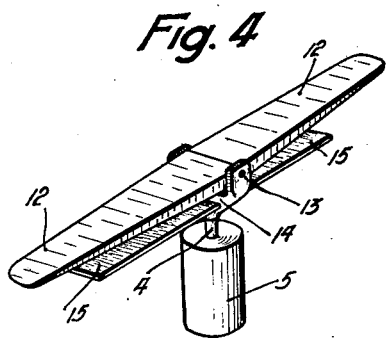
Fig. 4
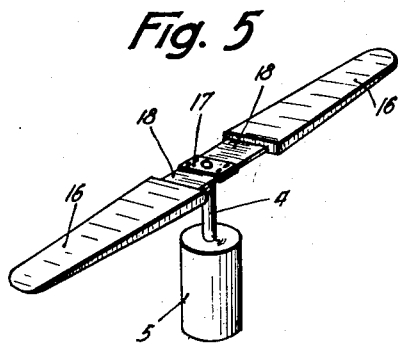
Fig. 5
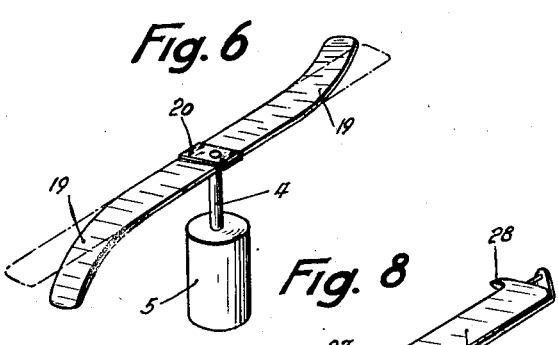
Fig. 6    Fig. 8
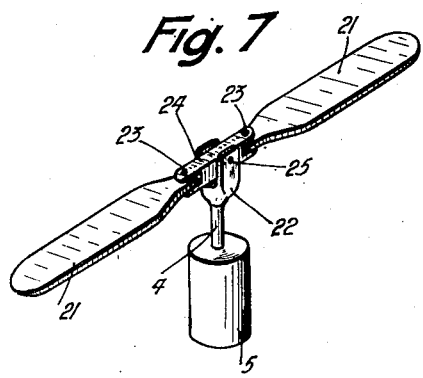
Fig. 7
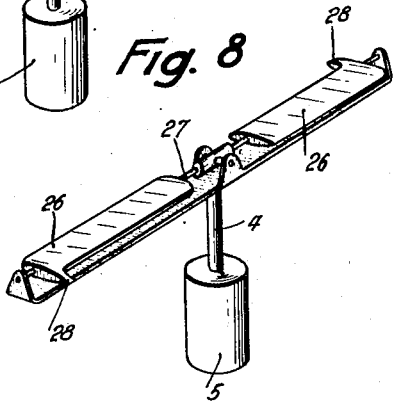
Inventor:
René Dorand
by Michael S. Striker
his agent July 29, 1952  R. DORAND  2,605,093
DETECTOR APPARATUS FOR DETECTING THE RATE
OF CHANGE OF INCLINATION OF AN OBJECT
Filed April 15, 1949  6 Sheets—Sheet 2
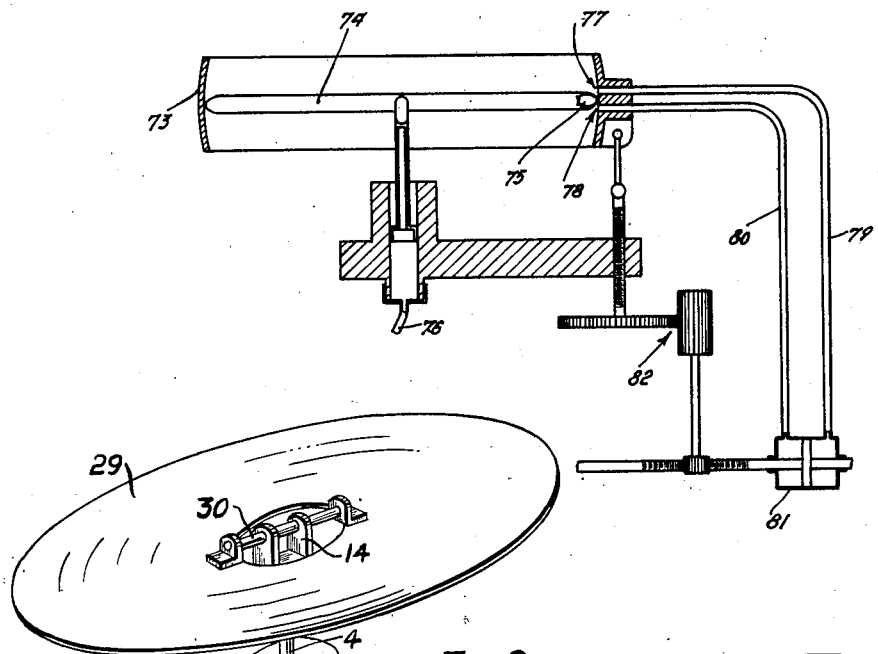
Fig. 18
Fig. 9
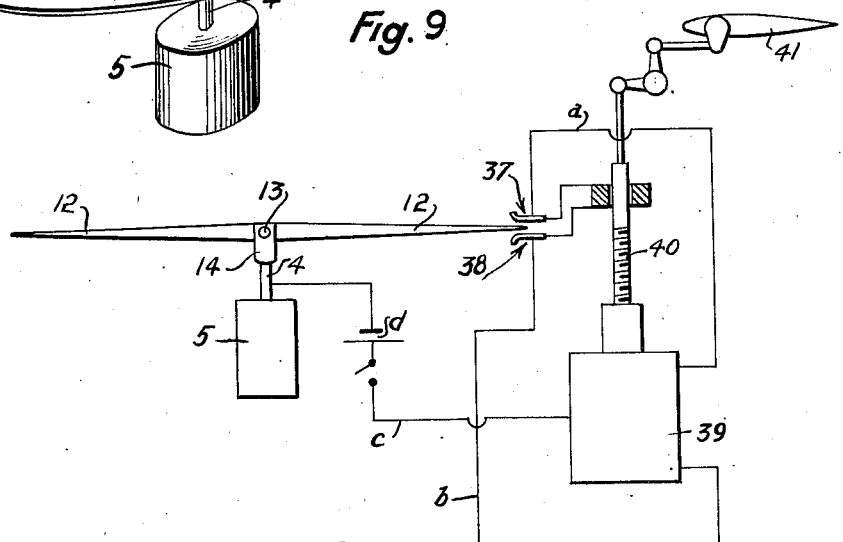
Fig. 17
Inventor:
René Dorand
by Michael S. Striker
his agent

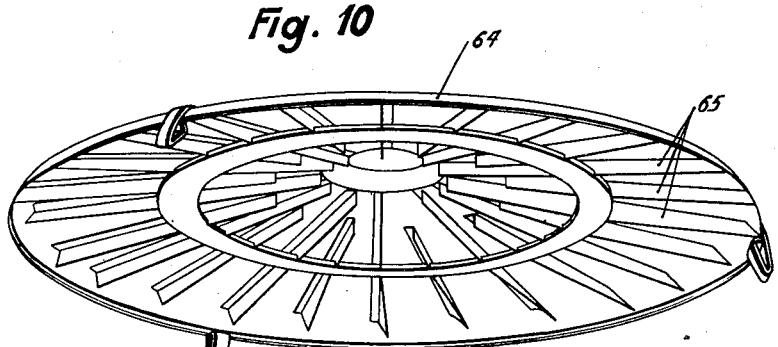
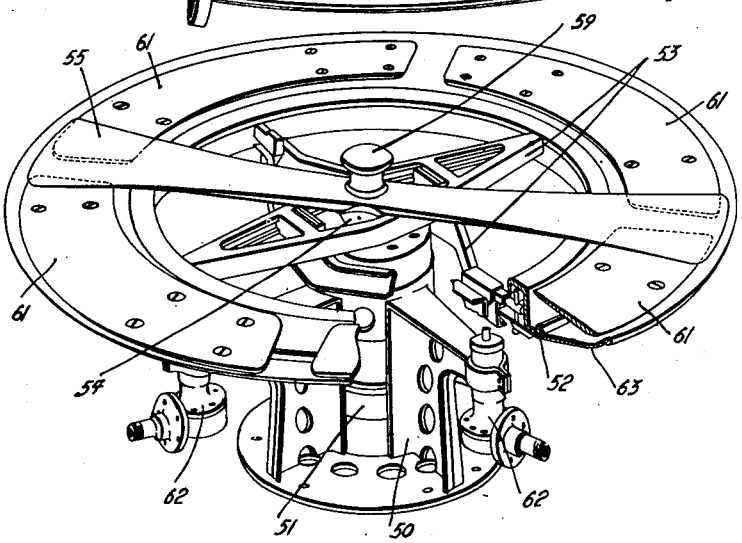
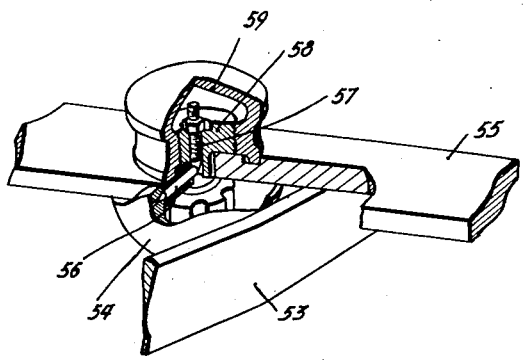

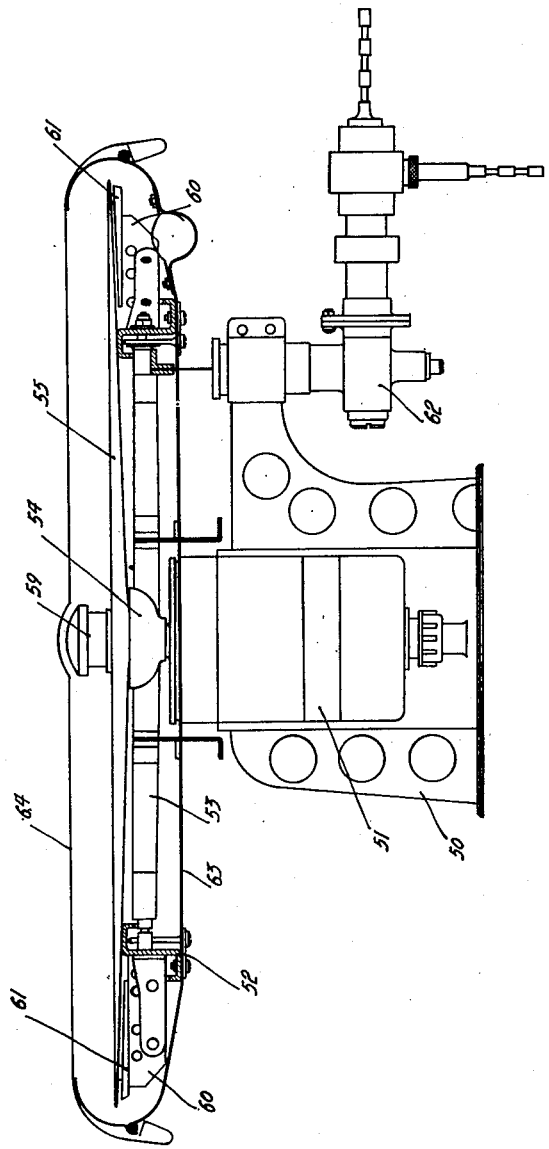

Patented July 29, 1952

2,605,093

UNITED STATES PATENT OFFICE 2,605,093

DETECTOR APPARATUS FOR DETECTING THE RATE OF CHANGE OF INCLINATION OF AN OBJECT

René Dorand, Versailles, France, assignor by mesne assignments, to Etat Francais Application April 15, 1949, Serial No. 87,761
In France April 23, 1948

9 Claims. (Cl. 264—1)

1

In order to stabilize machines such as aircraft subject to unexpected disturbing angular movements, use has already been made of arrangements intended for detecting these disturbances and for acting on control devices for the correction of these disturbing movements. When use is made, as detector of gyratory disturbance, of gyroscopes, of pendulous detectors, etc., the latter begin to come into action on the stabilising means for the machine only when the disturbing movement has reached already a certain amplitude. The correction of the disturbing effect is thus made with a delay or even at the wrong moment (more particularly when it is a question of disturbances of a periodic nature) and the result obtained is sometimes the reverse of what was sought for. This is due to the fact that the detectors mentioned above only record the amplitude of the angular disturbing movement.

In order to eliminate this drawback, use has been made already of detectors that are sensitive, not to the amplitude of the disturbing movement of the machine to be stabilized, but to the speed of this movement. Inasmuch as the speed factor is in advance of the amplitude factor, these detectors enable the disturbing movement to be corrected efficiently in theory, as soon as it begins to show itself.

There are at the present time detectors or indicators of speed of angular deviation known as "gyrometers" provided with a gyroscope with a single degree of play with flexible return. These instruments exhibit the drawback of having a certain inertia that is a cause of delay in response inherent in the very principle of the gyroscope which entails a heavy flywheel. The gyroscope with flexible return has, besides a natural oscillation period capable of disturbing the action of the gyrometer, an oscillation that has to be damped by a suitable brake. Another drawback of such gyrometers lies in the fact that, if the machines to be stabilized have to be highly accelerated at the instant of their launching (case of remotely-controlled projectiles), the mass of the gyroscopic flywheel gives rise to abnormal strains exerted on the fragile swinging pivots.

The gyrometers made for effecting the derivation of the movement in relation to the time, with a view to marking the speed of the disturbing movement, only begin to give indications capable of being turned to account with an appreciable lag over the appearance of the disturbing movement to be corrected.

2

The angular speed indicators provided with gyroscopes with two degrees of play from which the indications are derived in relation to the time exhibit the drawbacks of gyroscopes, whence the necessity of setting up frictionless relays if it is not desired to put the gyroscopes out of order and cause precession effects.

My invention has for its object to provide for an angular deviation speed detector or gyrometer enabling to prevent the drawbacks of the known apparatus and that may be employed to advantage for measuring and recording speeds of angular deviation and the angle of deviation of machines such as aircraft, rockets, ships, etc. and for stabilizing these machines, said gyrometer being characterized by the fact that it comprises a small rotor formed by a hub which is secured on a tiltable shaft driven in rotation around its axis and which carries at least one blade of which at least the free end has a degree of play so that, when the shaft is tilting, said blade end may, during the rotation of the rotor, oscillate or pulsate positively in a meridian plane defined by the axis of rotation of the shaft and the longitudinal axis of the blade, this rotor being combined with stationary recording means for picking-up the pulsation of the blade end in a stationary reference plane containing the axis of rotation of the rotor and, substantially, the direction of the angular disturbing movement of the shaft, which occurs around an axis substantially perpendicular to the axis of rotation of the shaft.

The recording of the blade end pulsation may be performed by means of electrical contact, capacity variation, self-induction variation etc.

Other particularities and characteristics of the gyrometer make their appearance in the disclosure that follows and that refers to some examples of execution of devices given solely as an example and illustrated in quite a diagrammatic way in the accompanying drawings in which:

Figs. 1 to 9 are perspective views of the nine different forms of execution of the rotor of the device;

Fig. 10 is a perspective view (cover removed) of an embodiment of the gyrometer rotor and its bearing system in accordance with the invention;

Fig. 11 is a perspective view partly stripped of the connection of a dual blade made in one piece, on the hub of the gyrometer;

Fig. 12 is a diagrammatic elevational view partly in section of the device shown in Fig. 10;

Fig. 17 illustrates a gyrometer, in which the pulsation of the blades of the rotor is recorded by electric contactor means; and Fig. 18 is a section of a gyrometer with detection and control by means of compressed air.

Figure 13:
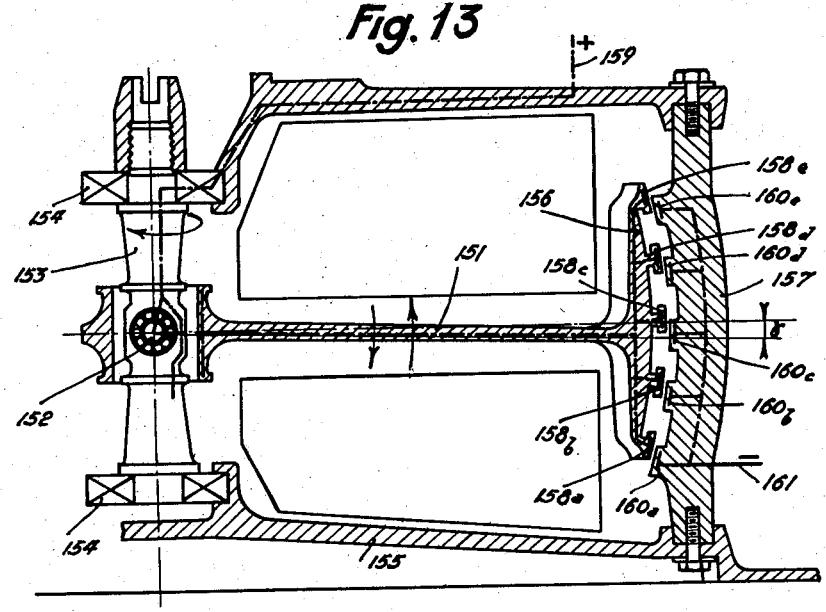
Fig. 13 is a diagrammatic view of an embodiment of a complete gyrometer the rotor of which is shown partly and in axial section, the apparatus having condensers for detecting the pulsation of the blade end.

In Fig. 1, the rotor of the gyrometer comprises three rigid blades 1 hinged to the hub 2 by so-called "thrust" joints 3, each at right angles to the axis 4 of the hub and to the median longitudinal axis of the blade in question, the above mentioned rotor being driven by a motor 5.

In the modification of Fig. 2, the rotor comprises a hub 6 and two diametrically opposite blades 7 of which the hinges 8, contained in the plane of rotation, are not at right angles to the longitudinal axis of the blades.

Fig. 3 illustrates a rotor comprising a single blade 9 furnished with a counterweight 9a and joined, at 10, to the hub 11.

In the embodiment of Fig. 4, the rotor comprises a pair of blades 12 mounted as a compensation bar, round an oscillation spindle 13, on the hub 14 that carries besides fixed blades 15 intended for the damping of the pulsation of the blades 12.

Instead of being connected to the hub through hinges the blades may be connected to the latter by flexible means.

In Fig. 5, the rigid blades 16 are connected to the hub 17 by spring blade connections 18.

In the simpler type of execution as shown in Fig. 6, the blades are flexible thin plates connected directly to the hub 20.

The blade may be connected also, as may be seen in Fig. 7 in which they are denoted by 21, to the hub 22 by drag joints 23 provided at the ends of a small central rocking lever 24 pivoting at 25 on the hub.

In order to increase the sensitivity of the apparatus, in the case of blades with large supporting surface, an additional degree of play is given to the blades 26 by enabling them, as may be seen in Fig. 8, to pivot round an axis of change of incidence 27 and there are arranged, at the ends of these blades, counter-weights 28 overhanging towards the front part of the blades.

In Fig. 9, the blades of the previous examples are replaced by a disc 29 coupled loosely or flexibly round one of its diameters appearing as a spindle 30 carried by the hub 14. The disc 29 has not necessarily a homogeneous mass distribution.

In all these forms of execution, the rotor is contained in an enclosure intended for its protection against the wind.

The working principle of the rotor of which some embodiments have been disclosed above is easy to understand.

When the spindle 4 of the rotor (a spindle that is stationary in relation to the machine to be stabilized) is vertical, for instance, under normal conditions and when it happens to be sloped forward with an angular speed Ω (angle of pitching) the compounding of the speeds (angular speed Ω and speed of rotation ω of the rotor in relation to the frame of the motor that drives it) gives rise to a compounded centrifugal force of which the maximum, headed upwards, is applied to the blade that crosses the plane comprising the axis of pitching and the axis of rotation of the rotor, the value of this maximum being:

$$Mcc = 2I\omega\Omega$$

wherein I is the moment of inertia of the blade around its pulsation axis.

This alternative force, the frequency of which is equal to the number of revolutions of the rotor, maintains the pulsation of each blade, this pulsation being damped through the action of the air on the blade; the maximum in amplitude of the pulsation is, in the special case of a pitching slope, in the neighbourhood of the plane of symmetry of the machine to be stabilized and the amplitude of this pulsation is in proportion to the angular deviation speed to be detected.

Thus the angular deviation speeds of the machine on which the rotor referred to above is assembled are materialized by the amplitude of the pulsation of the blades in a meridian plane marking off with the slope plane of the device an angle known as "dephasing" that is well defined for a given device, an angle that has only to be taken into consideration in the applications of the device.

As a rule, the device is set up so that the two planes mentioned above are merged, a result that is obtained, for instance, by making use of blades pivoting loosely round a thrust joint meeting the axis of rotation of the rotor and at right angles to this axis and to the longitudinal axis of the blade.

Calculation proves and tests attest that the blades are all the more sensitive in the new detector of angular deviation speed as they are heavier, as their surface is smaller and as the rotary speed of the rotor is less. However, to operate correctly, the surface of the blades must have a certain value, failing this the device would operate as an inclinometer.

The response period of the device is instantaneous in practice, the maximum deviation (pulsation) of a blade being reached when this blade has completed a revolution. If the rotary speed is 20 R. P. S., the response period is therefore less than 1/20 of a second.

The friction of the joints of the blades does not give rise to any change, in practice, in the working of the device, on account of the magnitude of the compounded centrifugal forces causing the pulsation.

Given that the blades may be light and assembled on sturdy hinges, the inertia effects in the case of machines subjected to high launching accelerations, do not involve any danger of damaging these connections or hinges.

In order to pick-up the deviation of the blade, that is to say the angular deviation speed and the angle of deviation of the shaft axis, it is sufficient, as shown on Figs. 13 to 18, to provide for a pick-up device for recording the blade pulsation, when said shaft axis executes a tilting motion.

In a practical embodiment of the rotor of the gyrometer and of its bearing device, the apparatus comprises, as shown in Figs. 10 to 12, a frame 50 carrying an electric motor 51. This frame carries also a cradle 52 in the shape of a crown fastened to the ends of a star 53 connected, through a ball-and-socket joint (or any other similar arrangement), on the upper support plate of the motor 51.

The upper end of the spindle of the motor 51 carries a hub 54 on which is connected, round an axis at right angles to that of the above mentioned spindle, a double blade 55.

In the execution of this blade connection as illustrated in Fig. 11, this connection is formed by two spindle ends 56 (of which only one is to be seen in the drawing) assembled to slide in the central portion of the double blade and of which the conical ends are engaged in holes (constituting bearings) of the hub 54. The engagement of the spindle ends 56 in the corresponding holes of the hub 54 is ensured by a conical pointed screw 57 engaging with the rear points of the above mentioned spindle ends, and this screw is engaged and clamped in a tapped plug 58 that is itself screwed in the blade 55, the whole being covered by a hollowed out knob 59 screwed on the plug 58.

In a modification, the above mentioned connection is provided, to advantage, with ball-bearings.

The circular cradle 52 carries, by means of insulating liners 60, one to four fixed armatures 61 in the shape of a ring-shaped segment.

The angular displacements of the cradle 52 (with the armatures that it carries) in relation to the frame 50 and in two meridian planes at 90° from each other are controlled by means of reducing gear devices, for instance of the screw and nut pattern housed in casings 62 mounted, at 90° from each other, on the frame 50 and actuated, for instance, from devices controlled by the gyrometer.

The cradle is enclosed to advantage in a protecting hooding provided with a bottom 63 and a movable cover 64. In order to avoid in some degree the drawing in rotation of the contained air into the space demarcated by the hooding 63—64, the cover 64 is provided to advantage with an inside blading 65 preventing the air to be drawn round with the rotor blades.

Figure 14:
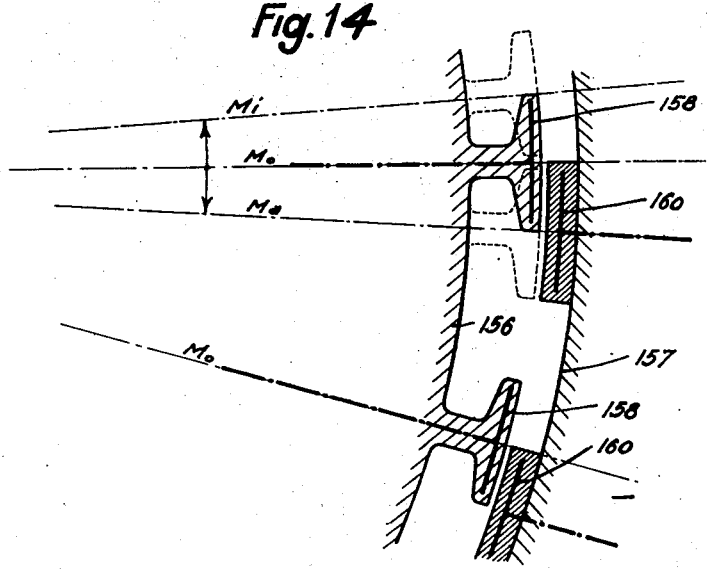
Fig. 14 is a view on a larger scale showing different positions, in the meridian detection plane, of the armatures of elemental condensers of the above embodiment.

In Figs. 13 and 14, the gyrometer comprises a double blade 151 pivoting round a spindle 152, on the rotor spindle 153 revolving in bearings 154 carried by the stator 155 of the apparatus. The spindle 153 is coupled with a motor 5a.

Each outer blade end shows a periphery in the shape of a spherical segment 156 passing, during the rotation of the rotor, in front of spherical zones 157 of the stator 155. It will be seen at once that whatever may be the amplitude of the blade pulsation, there may not be any unforeseen contact between the rotor and the stator.

Each spherical end 156 carries to advantage, as may be seen more particularly in Fig. 14, several condenser elemental armatures 158a, 158b, 158c, 158d, 158e suitably insulated and connected in parallel to a conductor 159.

Each spherical zone 157 carries likewise elemental armatures 160a, 160b, 160c, 160d, 160e, suitably insulated and connected in parallel to a conductor 161. Each pair of armatures 158a—160a, 158b—160b, 158c—160c, 158d—160d and 158e—160e forms an individual condenser. Fig. 14 shows that, when the blade does not pulsate (zero angular deviation speed) the armatures of the condensers spread over substantially the half of their surface (position Mo), a covering to which substantially corresponds the half-capacity of the condensers. This capacity may vary between a maximum (position Ma) and a minimum (position Mi) in the neighbourhood of zero, according as the blade pulsation is carried out in one direction or the other (in the meridian reference plane going through the spherical zone 157).

The conductors 159 and 161 are connected to a discriminator 47 of standard pattern which, together with the condensers 158—160, constitutes the recording device of the tilting speed and of the tilting angle of the spindle 153.

The discriminator may control the direction of rotation of a reversible motor 48 driving, through a screw-nut system and a suitable rod and lever system, a control member 46 of an aircraft for example.

Figure 15:
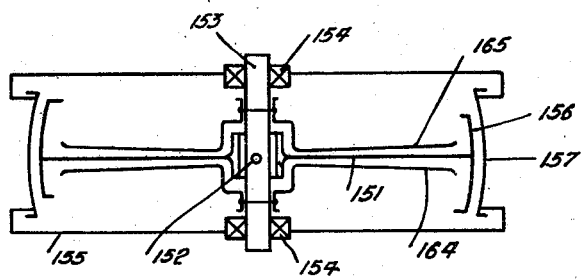
Fig. 15 is a view of a modification of the gyrometer furnished with gaseous fluid damping means.
Figure 16:
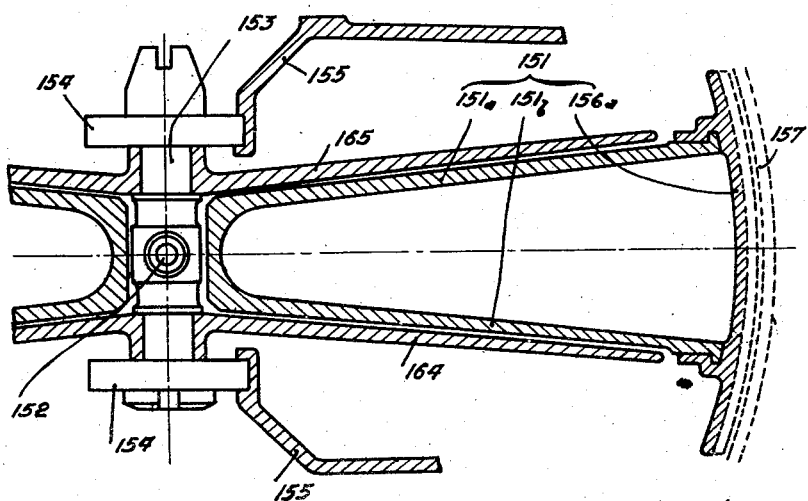
Fig. 16 is a part axial section, on a larger scale, of a modification of execution of the blade in the case of damping by means of gaseous fluid.

In the modification of Figs. 15 and 16, the pulsation of the blade or blades is damped through throttling of the air.

In Fig. 15, the blades 151 of the rotor driven by the motor 5b pulsates between two discs 164—165 integral with the rotor spindle 153. The rotor and its bearing device are connected to a recording system similar to that previously described (Fig. 13).

In the example of Fig. 16, the blade 151 is made up of two blade parts 151a and 151b connected together at their ends by a spherical segment 156a and the two blade elements mentioned above work together, as in the previous example, with two discs 164—165, so as to throttle the air cushions included between the blade and the discs under discussion.

Fig. 17 illustrates an example of complete apparatus having two blades 12 pivoted, at 13, on a hub 14 which is secured on a shaft 4 driven by a motor 5. The recording means consist of a commutator with two stationary blades 37, 38 and in which the mobile contact is formed by the blades 12. This commutator is connected through the conductors $a$, $b$ and through the common conductor $c$ (in which is mounted a current supply $d$) to a double-acting relay such as a reversible electric motor 39 driving, by means of a screw system 40 and of a rod system, the corrector controls 41 of the machine to be stabilized, the blades 37, 38 being carried by the screw 40 carrying out an axial translational movement.

In the example of execution of Fig. 18, the rotor of the gyrometer and the cradle brought under control 73 are driven by a fluid under pressure (compressed air, oil under pressure, etc.).

The rotor is started up by means of tangential jets of fluid under pressure suitably directed (by devices not shown in the drawing). The blade 74 is hollow in the same way as the spindle of the rotor and it carries at its end a nozzle 75. The assembly is fed, at 76, with fluid under pressure. The cradle carries, arranged on the same meridian plane, two openings 77, 78 connected, through pipes 79, 80 to a driving auxiliary motor 81. According as the cradle is sloped on one side or the other in relation to the blade, the fluid under pressure is sent differentially to an auxiliary motor constituted by a cylinder 81 containing a fluid driven piston. The latter may drive directly (or through suitable relays), on the one hand, the controls of a machine to be stabilized (for instance an aircraft) and, on the other hand, through a suitable rack and transmission gear 82, the cradle 73 that it brings into a position so that its plane of symmetry coincides again with the plane of rotation of the blade (pressure of the fluid equal on both sides of the auxiliary motor 81).

It is clear that the embodiments of the gyrometer as disclosed hereinabove and illustrated in the accompanying drawings have been given only as a non-restrictive guide and that any change in detail may be brought thereto.

What I claim is:

1. Detector apparatus for detecting the rate of change of inclination of an object liable to change its inclination, comprising in combination, a support rotatably mounted on the object for rotation relative thereto about an axis of rotation; drive means operatively connected to said support for rotating the same about said axis of rotation; blade means mounted on said support for rotation therewith, having an inner portion connected to said support and having an outer portion oscillatable in a direction substantially parallel to said axis of rotation, said outer portion of said blade means, when said support is rotated about said axis of rotation, rotating in a normal plane perpendicular to said axis of rotation when the inclination of said object does not change and moving out of said normal plane when the inclination of said object changes; and detector means associated with said blade means for detecting the amplitude of movement of said outer portion of said blade means out of said normal plane upon change of inclination of said object.

2. Detector apparatus for detecting the rate of change of inclination of an object liable to change its inclination, comprising in combination, a support rotatably mounted on the object for rotation relative thereto about an axis of rotation; drive means operatively connected to said support for rotating the same about said axis of rotation; elongated, rigid blade means mounted on said support for rotation therewith, having an inner end pivotally connected to said support for turning movement about an axis normal to said axis of rotation, and having an outer end oscillatable in a plane defined by said elongated blade means and said axis of rotation, said outer end of said blade means, when said support is rotating about said axis of rotation, rotating in a first plane making a first angle with said axis of rotation when the inclination of said object does not change and moving out of said first plane into a second plane making a second angle with said axis of rotation when the inclination of said object changes; and indicator means mounted on said object and associated with said blade means for indicating the angle between said first and second planes upon inclination of said object.

3. Detector apparatus as defined in claim 1, and wherein said indicator means comprises at least one stationary electric contact member and at least one movable electric contact member mounted on said outer portion of said blade means for contacting said stationary contact member to indicate movement of said outer portion of said blade means from said normal plane; and moving means operatively connected to said indicator means to be actuated thereby upon engagement between said contact members.

4. Detector apparatus as defined in claim 3 and wherein said moving means is an electric motor.

5. Detector apparatus as defined in claim 4, and wherein said motor is reversible.

6. Detector apparatus as defined in claim 1, and wherein said detector means comprises at least one stationary condenser plate means and at least one movable condenser plate means mounted on said outer portion of said blade means for movement therewith.

7. Detector apparatus as defined in claim 6, and wherein each of said condenser plate means comprises a plurality of arcuate segments formed along circles having their centers located in said axis of rotation.

8. Detector apparatus as defined in claim 1, and further comprising a fluid damping means mounted on said object and located about said blade means for damping the oscillatory movement of said outer portion thereof.

9. Detector apparatus as defined in claim 1, and wherein said blade means is hollow and said outer portion of said blade means terminates in an open end, and wherein said indicator means comprises a pair of conduits respectively having a pair of open ends respectively located on opposite sides of said normal plane and being adjacent thereto, a cylinder having opposite end portions respectively communicating with said pair of conduits, a piston slidably mounted in said cylinder, and a piston rod connected to said piston for movement therewith; said detector apparatus further comprising a fluid supply means communicating with said hollow blade means for leading a fluid thereto to be ejected from said open outer end of said blade means; and transmission means operatively connected to said piston rod and said pair of open ends of said conduits for moving the latter in a direction parallel to said axis of rotation upon movement of said piston rod, whereby, when said outer portion of said blade means moves out of said normal plane, fluid ejected from said outer end of said blade means flows through one of said conduits to move said piston in said cylinder so as to move said conduit ends in said direction parallel to said axis of rotation.

RENÉ DORAND.

REFERENCES CITED

The following references are of record in the file of this patent:

UNITED STATES PATENTS

| Number | Name | Date |
| --- | --- | --- |
| 1,700,406 | Hammond | Jan. 29, 1929 |
| 1,746,794 | Richardson | Feb. 11, 1930 |
| 2,384,516 | Young | Sept. 1, 1945 |
| 2,442,491 | Gieskieng | June 1, 1948 |

FOREIGN PATENTS

| Number | Country | Date |
| --- | --- | --- |
| 308,820 | Italy | July 16, 1930 |